UNITED STATES PATENT OFFICE.

MARY NOLAN, OF ST. LOUIS, MISSOURI.

IMPROVEMENT IN ARTIFICIAL-STONE COMPOSITION.

Specification forming part of Letters Patent No. 188,660, dated March 20, 1877; application filed December 7, 1876.

*To all whom it may concern:*

Be it known that I, MARY NOLAN, of St. Louis, Missouri, have invented a new and useful Improvement in Artificial-Stone Compositions, of which the following is a specification:

The object of my invention is to make a cheap and readily-molded composition for building-blocks and ceramic ware—an object which I attain in the following manner:

I take about twenty-five pounds of finely-pulverized glass, and mix it with about seventy-five pounds of kaolin-clay, the mixture being either effected after the kaolin has been reduced to a semi-fluid condition by admixture with water, or the ingredients may be mixed while in a dry, or nearly dry, condition. After the two ingredients have been stirred together until they become thoroughly and intimately mixed the composition is then molded into the desired shapes, and the blocks or other objects subsequently baked in a suitable furnace or kiln.

An object thus manufactured is of very hard texture, and presents a fine surface, closely resembling that of Parian ware, and will withstand the extremes of heat and cold. As an instance of this I may state that small hollow blocks of my improved composition have been heated to redness and then suddenly plunged into cold water without affecting their homogeneity.

A valuable feature of my invention is the tinting of the molded objects by employing glass of different colors in their composition, so that blocks and tiles of the most varied and beautiful character may be produced at but comparatively slight expense.

Owing to the compactness and strength of the baked composition it is especially applicable to the building of hollow walls for buildings, for which purpose the composition is converted by molding into hollow blocks.

The composition may also be used in the manufacture of ornaments for internal and external decorations.

The quality of the kaolin-clay employed may be varied to accord with the quality of the composition to be produced, and the proportions of the ingredients given may, in some cases, be varied slightly, a greater proportion of glass causing the production of a harder and more brittle composition.

I wish it to be understood that I do not desire to claim, broadly, the use of glass in the manufacture of artificial-stone compositions; but

I claim as my invention—

An artificial-stone composition, consisting of pulverized glass and kaolin, combined substantially in the manner and proportions set forth.

In testimony whereof I have signed my name to this specification in the presence of two subscribing witnesses.

MARY NOLAN.

Witnesses:
HERMANN MOESSNER,
HARRY SMITH.